(12) United States Patent
Odanaka et al.

(10) Patent No.: US 7,326,878 B2
(45) Date of Patent: Feb. 5, 2008

(54) LASER BEAM PROCESSING MACHINE

(75) Inventors: Kentaro Odanaka, Tokyo (JP);
Tomoaki Endo, Tokyo (JP)

(73) Assignee: Disco Corporation, Tokyo (JP)

( * ) Notice: Subject to any disclaimer, the term of this patent is extended or adjusted under 35 U.S.C. 154(b) by 0 days.

(21) Appl. No.: 11/512,307

(22) Filed: Aug. 30, 2006

(65) Prior Publication Data

US 2007/0051710 A1   Mar. 8, 2007

(30) Foreign Application Priority Data

Sep. 7, 2005 (JP) ............................. 2005-259346

(51) Int. Cl.
*B23K 26/14* (2006.01)
(52) U.S. Cl. ................................. 219/121.84
(58) Field of Classification Search ............ 219/121.84
See application file for complete search history.

(56) References Cited

U.S. PATENT DOCUMENTS

| 4,027,137 | A | * | 5/1977 | Liedtke | ................. | 219/121.84 |
| 4,467,171 | A | * | 8/1984 | Ramos | ................. | 219/121.84 |
| 6,580,054 | B1 | | 6/2003 | Liu et al. | | |
| 6,960,739 | B2 | | 11/2005 | Liu et al. | | |
| 2003/0226832 | A1 | | 12/2003 | Liu et al. | | |
| 2004/0226927 | A1 | * | 11/2004 | Morikazu et al. | ...... | 219/121.84 |

FOREIGN PATENT DOCUMENTS

| DE | 3923829 | A1 | * | 1/1991 |
| DE | 19840934 | A | * | 3/2000 |
| JP | 59-163093 | A | * | 9/1984 |
| JP | 2-99293 | A | * | 4/1990 |
| JP | 7-9184 | A | * | 1/1995 |
| JP | 9-192870 | A | * | 7/1997 |
| JP | 2000-317671 | A | * | 11/2000 |
| JP | 2004-9139 | | | 1/2004 |
| WO | 03/095140 | | | 11/2003 |

* cited by examiner

*Primary Examiner*—Geoffrey S. Evans
(74) *Attorney, Agent, or Firm*—Smith, Gambrell & Russell, LLP

(57) ABSTRACT

A laser beam processing machine includes a dust discharger which includes a first cover member mounted to the lower end of the condenser and a first opening for letting a laser beam applied from the condenser pass therethrough in the bottom wall, a second cover member which is arranged to surround the first cover member and has a second opening for allowing a laser beam applied from a condenser pass therethrough and sucking in dust in the bottom wall, an air introduction chamber which is formed between the first cover member and the condenser and communicates with the first opening, a dust collection chamber which is formed between the first cover member and the second cover member and communicates with the second opening, a first air supplier for supplying air to the air introduction chamber, and a swirling flow generator for generating a swirling flow in the dust collection chamber.

3 Claims, 5 Drawing Sheets

(a)

(b)

LASER BEAM PROCESSING MACHINE

FIELD OF THE INVENTION

The present invention relates to a laser beam processing machine for laser processing a workpiece such as a semiconductor wafer.

DESCRIPTION OF THE PRIOR ART

In the production process of a semiconductor device, a plurality of areas are sectioned by dividing lines called "streets" arranged in a lattice pattern on the front surface of a substantially disk-like semiconductor wafer, and a device such as IC or LSI is formed in each of the sectioned areas. Individual semiconductor chips are manufactured by cutting this semiconductor wafer along the streets to divide it into the areas in which a device is formed. An optical device wafer comprising light receiving devices such as photodiodes or light emitting devices such as laser diodes on the front surface of a sapphire substrate is also cut along the streets to be divided into individual optical devices such as photodiodes or laser diodes which are widely used in electric appliances.

As a means of dividing a wafer such as the above semiconductor wafer or optical device wafer along the streets, JP-A 2004-9139 discloses a method in which a pulse laser beam is applied along streets formed on the wafer to form grooves and the wafer is divided along the grooves.

When a laser beam is applied along a street of a wafer such as a silicon or sapphire wafer as a workpiece, however, there is such a problem that silicon or sapphire is molten, and molten wastes, that is, debris scatter and adhere onto the surface of a device formed in a rectangular area of the wafer, thereby reducing the quality of the device. Further, there arises a problem that dust such as the scattered debris adheres to a condenser lens incorporated in a condenser for applying a laser beam, so that the application of the laser beam is prevented.

To solve the above problems, WO 03/095140 A1 discloses a laser beam processing machine comprising a suction means for sucking in dust such as debris produced by the application of a laser beam to a workpiece from the condenser of laser beam application means. The suction means of this laser beam processing machine comprises a central hood which is arranged to surround the condenser and to which the laser beam application side of the condenser is open and an outer hood which is arranged to surround the central hood and to which the laser beam application side of the condenser is open, and the central hood and the outer hood are connected to a suction source.

Although the suction means disclosed by the above WO 03/095140 A1 can suck in dust such as debris produced by the application of a laser beam to the workpiece from the condenser, there is a problem in that the dust sucked into the outer hood and the central hood accumulates and blocks a connection port to the suction source, thereby reducing suction capacity in a short period of time. There is another problem in that dust sucked into the central hood adheres to the condenser lens of the condenser.

SUMMARY OF THE INVENTION

It is an object of the present invention to provide a laser beam processing machine capable of efficiently collecting and discharging dust such as debris produced by the application of a laser beam to a workpiece from a condenser.

To attain the above object, according to the present invention, there is provided a laser beam processing machine comprising a chuck table for holding a workpiece, a laser beam application means having a condenser for applying a laser beam to the workpiece held on the chuck table to process it, and a dust discharge means for collecting and discharging dust produced by the application of a laser beam to the workpiece from the condenser, wherein the dust discharge means comprises a first cover member which is mounted on the lower end of the condenser and has a first opening for letting a laser beam applied from the condenser pass therethrough in the bottom wall, a second cover member which is arranged to surround the first cover member and has a second opening for letting a laser beam applied from the condenser pass therethrough and sucking in dust in the bottom wall, an air introduction chamber which is formed between the first cover member and the condenser and communicates with the first opening, a dust collection chamber which is formed between the first cover member and the second cover member and communicates with the second opening, a first air supply means for supplying air to the air introduction chamber, a swirling flow generating means for generating a swirling flow in the dust collection chamber, a second air supply means for supplying air to the swirling flow generating means, and an exhaust means connected to the dust collection chamber.

A tapered portion which is tapered toward its lower end is provided in the lower part of the first cover member, and a dust collection chamber-forming hole having an inner wall which is tapered toward its lower end in conformity with the outer wall of the tapered portion of the first cover member is formed in the lower part of the second cover member. The swirling flow generating means has a plurality of air ejection holes formed in the tangential direction to the inner wall of the dust collection chamber-forming hole and an air passage communicating with the plurality of air ejection holes and the second air supply means in the lower part of the second cover member.

In the laser beam processing machine according to the present invention, by supplying air from the second air supply means to the swirling flow generating means, a swirling flow is formed in the dust collection chamber and negative pressure is generated in the second opening. As a result, dust produced by the application of a laser beam to the workpiece is sucked into the dust collection chamber from the second opening in which negative pressure is generated and discharged through the exhaust means. Therefore, the dust does not adhere to the surface of the workpiece. Since a swirling flow is formed in the dust collection chamber, the sucked dust does not accumulate in the dust collection chamber and is smoothly discharged through the exhaust means. Therefore, a dust discharge function is maintained for a long time. Further, according to the present invention, since air supplied from the first air supply means is ejected toward the second opening from the first opening, the dust sucked from the second opening does not enter the air introduction chamber through the first opening and therefore, does not adhere to the condenser lens of the condenser.

DETAILED DESCRIPTION OF THE PREFERRED EMBODIMENT

A preferred embodiment of a laser beam processing machine constituted according to the present invention will be described in more detail hereinunder with reference to the accompanying drawings.

Figure 1:
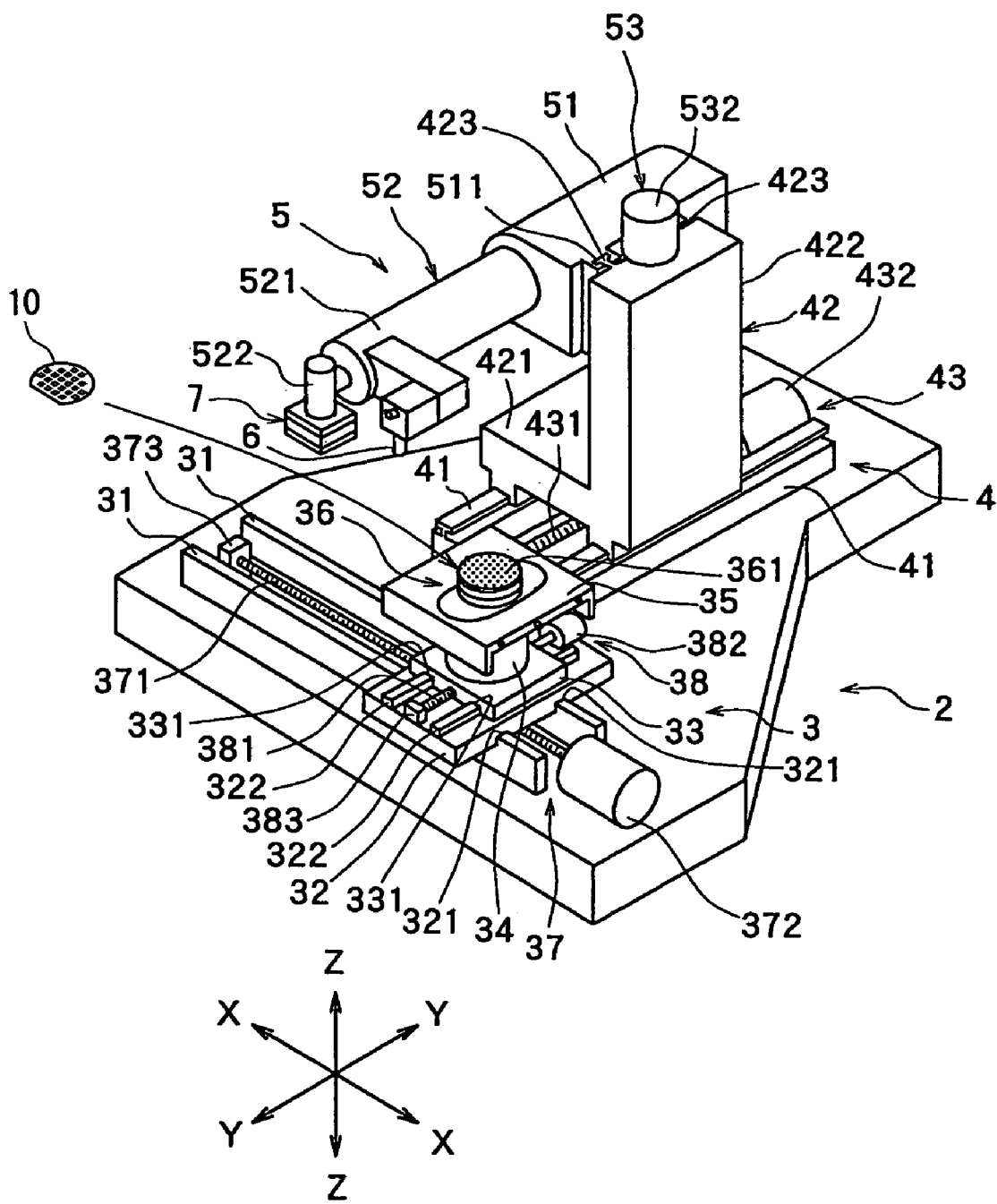
FIG. 1 is a perspective view of a laser beam processing machine constituted according to the present invention.

FIG. 1 is a perspective view of a laser beam processing machine constituted according to the present invention. The laser beam processing machine shown in FIG. 1 comprises a stationary base 2, a chuck table mechanism 3 for holding a workpiece, which is mounted on the stationary base 2 in such a manner that it can move in a processing-feed direction indicated by an arrow X, a laser beam application unit support mechanism 4 mounted on the stationary base 2 in such a manner that it can move in an indexing-feed direction indicated by an arrow Y perpendicular to the direction indicated by the arrow X, and a laser beam application unit 5 mounted on the laser beam application unit support mechanism 4 in such a manner that it can move in a direction indicated by an arrow Z.

The above chuck table mechanism 3 comprises a pair of guide rails 31 and 31 mounted on the stationary base 2 and arranged parallel to each other in the processing-feed direction indicated by the arrow X, a first sliding block 32 mounted on the guide rails 31 and 31 in such a manner that it can move in the processing-feed direction indicated by the arrow X, a second sliding block 33 mounted on the first sliding block 32 in such a manner that it can move in the indexing-feed direction indicated by the arrow Y, a support table 35 supported on the second sliding block 33 by a cylindrical member 34, and a chuck table 36 as a workpiece holding means. This chuck table 36 comprises an adsorption chuck 361 made of a porous material, and a workpiece, for example, a disk-like semiconductor wafer is held on this adsorption chuck 361 by a suction means that is not shown. The chuck table 36 constituted as described above is rotated by a pulse motor (not shown) installed in the cylindrical member 34.

The above first sliding block 32 has, on its undersurface, a pair of to-be-guided grooves 321 and 321 to be fitted to the above pair of guide rails 31 and 31 and on the top surface a pair of guide rails 322 and 322 formed parallel to each other in the indexing-feed direction indicated by the arrow Y. The first sliding block 32 constituted as described above can move along the pair of guide rails 31 and 31 in the processing-feed direction indicated by the arrow X by fitting the to-be-guided grooves 321 and 321 to the pair of guide rails 31 and 31, respectively. The chuck table mechanism 3 in the illustrated embodiment comprises a processing-feed means 37 for moving the first sliding block 32 along the pair of guide rails 31 and 31 in the processing-feed direction indicated by the arrow X. The processing-feed means 37 comprises a male screw rod 371 arranged between the above pair of guide rails 31 and 31 parallel thereto and a drive source such as a pulse motor 372 for rotary-driving the male screw rod 371. The male screw rod 371 is, at its one end, rotatably supported to a bearing block 373 fixed on the above stationary base 2 and is, at the other end, transmission-coupled to the output shaft of the above pulse motor 372. The male screw rod 371 is screwed into a threaded through-hole formed in a female screw block (not shown) projecting from the undersurface of the center portion of the first sliding block 32. Therefore, by driving the male screw rod 371 in a normal direction or reverse direction with the pulse motor 372, the first sliding block 32 is moved along the guide rails 31 and 31 in the processing-feed direction indicated by the arrow X.

The above second sliding block 33 has, on its undersurface, a pair of to-be-guided grooves 331 and 331 to be fitted to the pair of guide rails 322 and 322 on the top surface of the above first sliding block 32 and can move in the indexing-feed direction indicated by the arrow Y by fitting the to-be-guided grooves 331 and 331 to the pair of guide rails 322 and 322, respectively. The chuck table mechanism 3 in the illustrated embodiment comprises a first indexing-feed means 38 for moving the second sliding block 33 in the indexing-feed direction indicated by the arrow Y along the pair of guide rails 322 and 322 formed on the first sliding block 32. The first indexing means 38 comprises a male screw rod 381 which is arranged between the above pair of guide rails 322 and 322 in parallel thereto and a drive source such as a pulse motor 382 for rotary-driving the male screw rod 381. The male screw rod 381 is, at its one end, rotatably supported to a bearing block 383 fixed on the top surface of the above first sliding block 32 and is, at the other end, transmission-coupled to the output shaft of the above pulse motor 382. The male screw rod 381 is screwed into a threaded through-hole formed in a female screw block (not shown) projecting from the undersurface of the center portion of the second sliding block 33. Therefore, by driving the male screw rod 381 in a normal direction or reverse direction with the pulse motor 382, the second sliding block 33 is moved along the guide rails 322 and 322 in the indexing-feed direction indicated by the arrow Y.

The above laser beam application unit support mechanism 4 comprises a pair of guide rails 41 and 41 that are mounted on the stationary base 2 and arranged parallel to each other in the indexing-feed direction indicated by the arrow Y and a movable support base 42 mounted on the guide rails 41 and 41 in such a manner that it can move in the direction indicated by the arrow Y. This movable support base 42 consists of a movable support portion 421 movably mounted on the guide rails 41 and 41 and a mounting portion 422 mounted on the movable support portion 421. The mounting portion 422 is provided with a pair of guide rails 423 and 423 extending parallel to each other in the direction indicated by the arrow Z on one of its flanks. The laser beam application unit support mechanism 4 in the illustrated embodiment comprises a second indexing means 43 for moving the movable support base 42 along the pair of guide rails 41 and 41 in the indexing-feed direction indicated by the arrow Y. This second indexing means 43 has a male screw rod 431 arranged between the above pair of guide rails 41 and 41 in parallel thereto and a drive source such as a pulse motor 432 for rotary-driving the male screw rod 431. The male screw rod 431 is, at its one end, rotatably supported to a bearing block (not shown) fixed on the above stationary base 2 and is, at the other end, transmission-coupled to the output shaft of the above pulse motor 432. The male screw rod 431 is screwed into a threaded through-hole formed in a female screw block (not shown) projecting from the undersurface of the center portion of the movable support portion 421 constituting the movable support base 42. Therefore, by driving the male screw rod 431 in a normal direction or reverse direction with the pulse motor 432, the movable support base 42 is moved along the guide rails 41 and 41 in the indexing-feed direction indicated by the arrow Y.

The laser beam application unit 5 in the illustrated embodiment comprises a unit holder 51 and a laser beam application means 52 secured to the unit holder 51. The unit holder 51 has a pair of to-be-guided grooves 511 and 511 to be slidably fitted to the pair of guide rails 423 and 423 formed on the above mounting portion 422 and is supported in such a manner that it can move in the direction indicated by the arrow Z by fitting the to-be-guided grooves 511 and 511 are fitted to the above guide rails 423 and 423, respectively.

The illustrated laser beam application means 52 applies a pulse laser beam from a condenser 522 attached to the end of a cylindrical casing 521 arranged substantially horizontally. A image pick-up means 6 for picking up an image of the area to be laser processed by the above laser beam application means 52 is mounted on the front end portion of the casing 521 constituting the laser beam application means 52. This image pick-up means 33 comprises an image pick-up device (CCD) and supplies an image signal to control means that is not shown. A dust discharge means 7 for collecting and discharging dust produced by the application of a laser beam to the workpiece from the condenser 522 is mounted onto the lower end portion of the condenser 522. This dust discharge means 7 will be described in detail later.

The laser beam application unit 5 in the illustrated embodiment comprises a moving means 53 for moving the unit holder 51 along the pair of guide rails 423 and 423 in the direction indicated by the arrow Z. The moving means 53 has a male screw rod (not shown) arranged between the pair of guide rails 423 and 423 and a drive source such as a pulse motor 532 for rotary-driving the male screw rod. By driving the male screw rod (not shown) in a normal direction or reverse direction with the pulse motor 532, the unit holder 51 and the laser beam application means 52 are moved along the guide rails 423 and 423 in the direction indicated by the arrow Z. In the illustrated embodiment, the laser beam application means 52 is moved up by driving the pulse motor 532 in a normal direction and moved down by driving the pulse motor 532 in the reverse direction.

Figure 2:
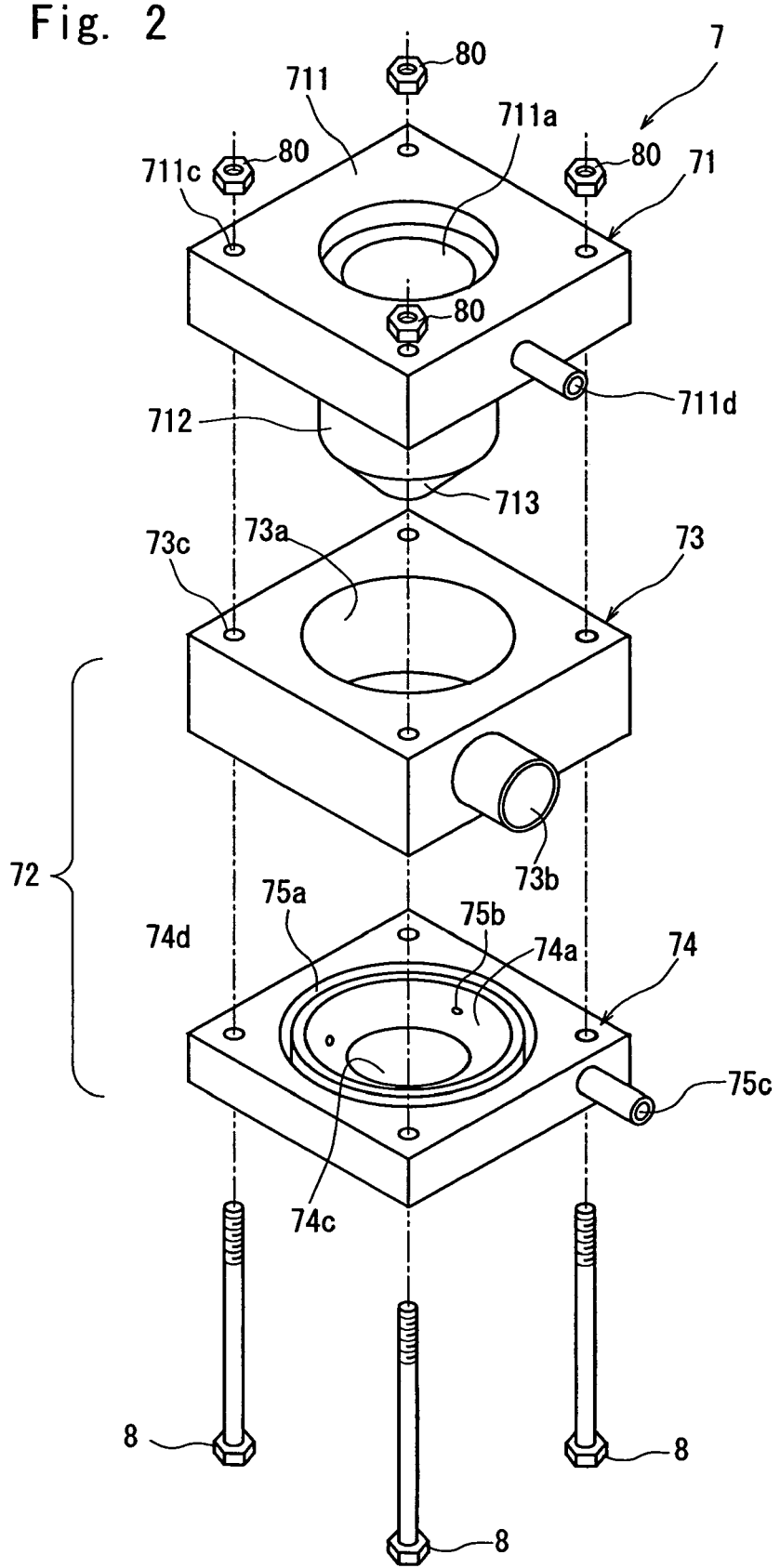
FIG. 2 is an exploded perspective view of a dust discharge means mounted onto the condenser of the laser beam processing machine shown in FIG. 1.
Figure 3:
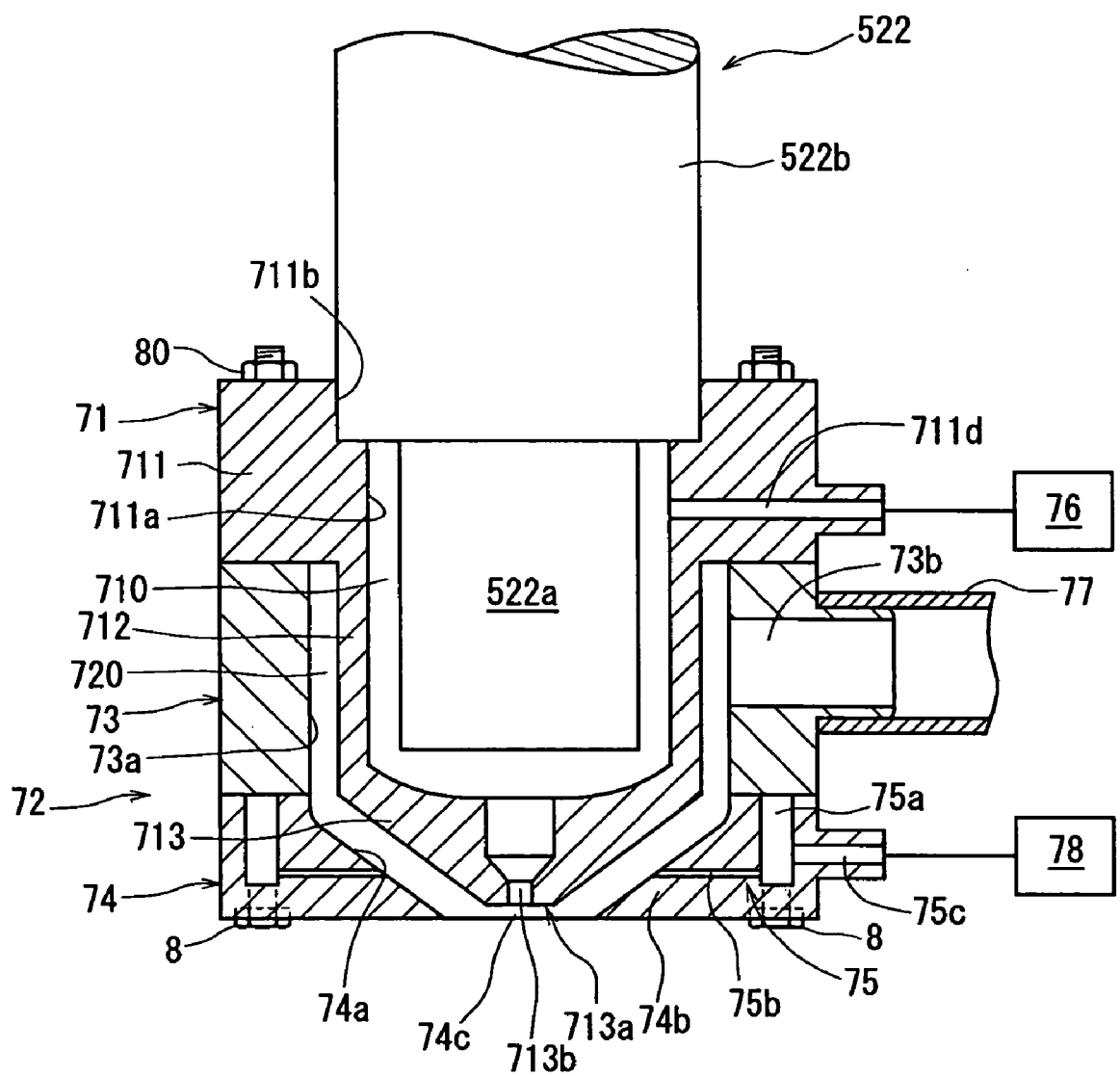
FIG. 3 is a sectional view of the dust discharge means mounted onto the condenser of the laser beam processing machine shown in FIG. 1.

A description will be subsequently given of the above dust discharge means 7 with reference to FIG. 2 and FIG. 3. FIG. 2 is an exploded perspective view of the dust discharge means 7, and FIG. 3 is a sectional view of the dust discharge means 7.

The dust discharge means 7 in the illustrated embodiment comprises a first cover member 71 and a second cover member 72. The first cover member 71 consists of a mounting portion 711 situated at the top, a middle portion 712 which is connected to the lower end of the mounting portion 711 and surrounds the outer wall of the condenser 522, and a tapered portion 713 which is connected to the lower end of the middle portion 712 and tapered toward the lower end. The mounting portion 711 is rectangular and has a hole 711a at the center. The inner diameter of this hole 711a is larger than the outer diameter of the small-diameter lower portion 522a of the housing of the condenser 522. A fitting recess 711b to be fitted to the large-diameter upper portion 522b of the housing of the condenser 522 is formed in the upper end portion of the mounting portion 711. By press fitting the large-diameter upper portion 522b of the housing in the fitting recess 711b, the first cover member 71 is mounted onto the housing of the condenser 522. A bolt insertion hole 711c for accepting a fastening bolt 8 is each formed in the four corners of the rectangular mounting portion 711, as shown in FIG. 2.

The middle portion 712 constituting the first cover member 71 is cylindrical and connected to the lower end of the mounting portion 711, and its inner diameter is the same as the inner diameter of the hole 711a formed in the mounting portion 711. Therefore, an air introduction chamber 710 is formed between the inner walls of the mounting portion 711 and the middle portion 712 and the outer wall of the condenser 522.

The tapered portion 713 constituting the first cover member 71 is conical and connected to the lower end of the middle portion 712, and a first opening 713b which communicates with the air introduction chamber 710 and allows a laser beam applied from the condenser 522 pass therethrough is formed in its bottom wall 713a. This first opening 713b has a diameter of 3 mm in the illustrated embodiment. An air introduction hole 711d communicating with the air introduction chamber 710 is formed in the mounting portion 711 of the first cover member 71. This air introduction hole 711d is connected to first air supply means 76.

The second cover member 72 constituting the above dust discharge means 7 consists of an upper member 73 and a lower member 74 in the illustrated embodiment. The upper member 73 is rectangular and has a hole 73a whose diameter is larger than the outer diameter of the middle portion 712 of the first cover member 71 at the center. The upper member 73 is arranged to surround the middle portion 712 of the first cover member 71. Therefore, a space forming a dust collection chamber 720 is existent between the outer wall of the middle portion 712 of the first cover member 71 and the inner wall of the upper member 73 of the second cover member 72. An exhaust port 73b communicating with the dust collection chamber 720 is formed in the upper member 73. An exhaust duct 77 is connected to the exhaust port 73b. The exhaust port 73b and the exhaust duct 77 constitute an exhaust means connected to the dust collection chamber 720. A bolt insertion hole 73c for accepting the fastening bolt 8 is each formed in the four corners of the rectangular upper member 73, as shown in FIG. 2.

The lower member 74 constituting the second cover member 72 is rectangular and has a duct collection chamber forming hole 74a with a conical inner wall that is tapered toward the lower end, in conformity with the outer wall of the conical tapered portion 713 of the above first cover member 71 at the center. A space forming the dust collection chamber 720 is existent between the outer wall of the tapered portion 713 and the inner wall of the hole 74a. A second opening 74c which communicates with the dust collection chamber 720 and allows a laser beam applied from the condenser 522 pass therethrough, is formed in the bottom wall 74b of the lower member 74. This second opening 74c has a diameter of 25 mm in the illustrated embodiment. The lower member 74 of the second cover member 72 constituting the dust discharge means 7 in this illustrated embodiment comprises a swirling flow generating means 75 for generating a swirling flow in the dust collection chamber 720. The swirling flow generating means 75 comprises an annular air passage 75a, a plurality of air ejection holes 75b, which are open to the inner wall of the above dust collection chamber-forming hole 74a and communicate with the annular air passage 75a, and an air supply hole 75c which is open to the outside and communicates with the annular air passage 75a. The top of the annular air passage 75a is covered by the undersurface of the upper member 73. The number of the plurality of air ejection holes 75b is 3 in the illustrated embodiment, and they are formed in the tangential direction to the inner wall of the dust collection chamber-forming hole 74a. The air supply hole 75c is connected to second air supply means 78. A bolt insertion hole 74d for accepting the fastening bolt 8 is each formed in the four corners of the rectangular lower member 74 constituting the second cover member 72, as shown in FIG. 2. Portions around the bolt insertion holes 74d on the undersurface of the lower member 74 are counter bored so that part of the head of the fastening bolt 8 can be inserted into the bolt insertion holes 74d.

The dust discharge means 7 comprising the first cover member 71 and the second cover member 72 is assembled by inserting the fastening bolts 8 into the bolt insertion holes 711c formed in the mounting portion 711 of the first cover member 71 and then, screwing nuts 80 to the end portions of the fastening bolts 8.

The dust discharge means 7 in the illustrated embodiment is constituted as described above, and air of 5 atm. is supplied from the second air supply means 78 at a rate of 70 liters/min. This air is ejected into the lower portion of the dust collection chamber 720 from the plurality of air ejection holes 75b through the air supply hole 75c and the annular air passage 75a at a rate of 500 m/sec, for example. As a result, a swirling flow is formed in the dust collection chamber 720, and negative pressure is generated in the second opening 74c communicating with the lower center portion of the dust collection chamber 720. Therefore, air (including dust which will be described later) below the dust discharge means 7 mounted to the condenser 522 is sucked into the dust collection chamber 720 from the second opening 74c and discharged from the exhaust duct 77 through the exhaust port 73b. The amount of air sucked from the second opening 74c is about 200 liters/min in the illustrated embodiment. Meanwhile, 5 atm. air is supplied from the first air supply means 76 at a rate of 20 liters/min. This air is ejected toward the second opening 74c from the first opening 713b through the air introduction hole 711d and the air introduction chamber 710. Therefore, dust which will be described later does not enter the air introduction chamber 710 through the first opening 713b, thereby making it possible to prevent the dust from adhering to the condenser lens of the condenser 522. The air ejected toward the second opening 74c from the first opening 713b is sucked into the dust collection chamber 720 together with air sucked from the outside and discharged from the exhaust duct 77 through the exhaust port 73b constituting the exhaust means as negative pressure is generated in the second opening 74c, as described above.

The laser beam processing machine in the illustrated embodiment is constituted as described above and its function will be described hereinunder.

A semiconductor wafer 10 as a workpiece is first placed on the chuck table 36 of the laser beam processing machine shown in FIG. 1 and suction-held on the chuck table 36 by activating the suction means that is not shown. Streets are formed on the front surface of the semiconductor wafer 10 in a lattice pattern, and a device such as IC or LSI is formed in a plurality of areas sectioned by streets arranged in the lattice pattern. The chuck table 36 suction-holding the semiconductor wafer 10 is positioned right below the image pick-up means 6 by the processing-feed means 37. After the chuck table 36 is positioned right below the image pick-up means 6, alignment work for detecting the area to be processed of the semiconductor wafer 10 is carried out by the image pick-up means 6 and the unshown control means. That is, the image pick-up means 6 and the control means (not shown) carry out image processing such as pattern matching etc. to align a street formed in a predetermined direction of the semiconductor wafer 10 with the condenser 522 of the laser beam application means 52 for applying a laser beam along the street, thereby performing the alignment of a laser beam application position. The alignment of the laser beam application position is also carried out on streets formed on the semiconductor wafer 10 in a direction perpendicular to the above predetermined direction.

Figure 4:
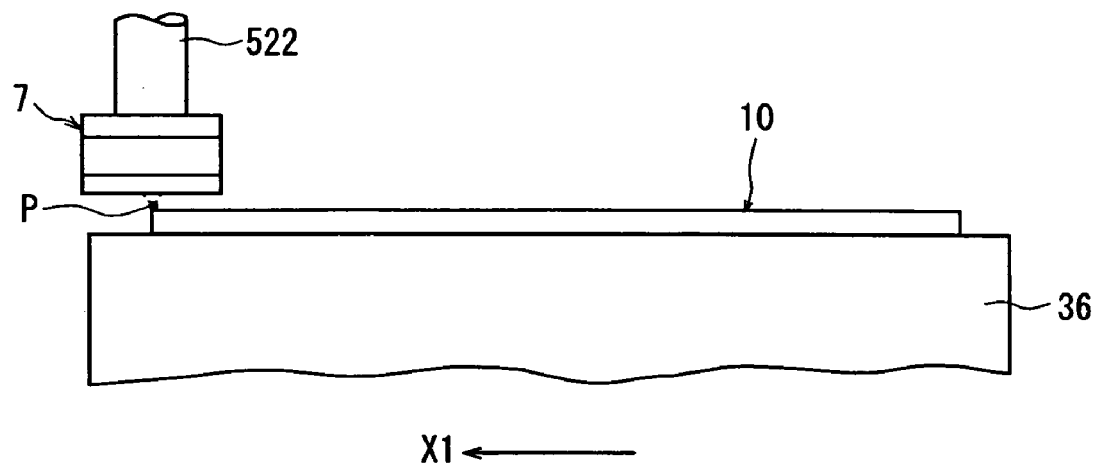
FIGS. 4(a) and 4(b) are explanatory diagrams showing a groove forming step which is carried out by the laser beam processing machine shown in FIG. 1.
Figure 4:
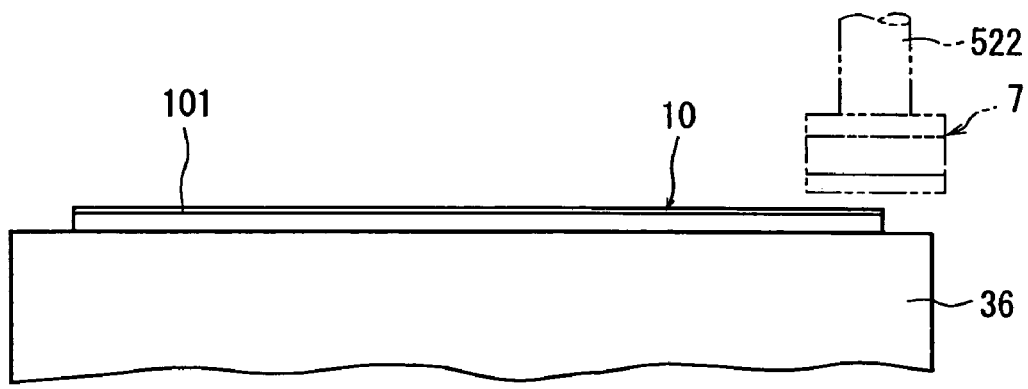

After the alignment of the laser beam application position is carried out by detecting the street formed on the semiconductor wafer 10 held on the chuck table 36 as described above, the chuck table 36 is moved to a laser beam application area where the condenser 522 of the laser beam application means 52 is located to bring one end (left end in FIG. 4(a)) of the predetermined street to a position right below the condenser 522, as shown in FIG. 4(a). The focal point P of a pulse laser beam applied from the condenser 522 is set to a portion near the front surface (top surface) of the semiconductor wafer 10. The chuck table 36, that is, the semiconductor wafer 10 is then moved in the direction indicated by the arrow X1 in FIG. 4(a) at a predetermined processing-feed rate while a pulse laser beam of wavelength having absorptivity for the semiconductor wafer is irradiated to the semiconductor wafer 10 from the condenser 522 of the laser beam application means 52. When the other end (right end in FIG. 4(b)) of the street reaches a position right below the condenser 522, the application of the pulse laser beam is suspended, and the movement of the chuck table 36, that is, the semiconductor wafer 10 is stopped. As a result, a groove 101 is formed along the street in the semiconductor wafer 10 as shown in FIG. 4(b) (groove forming step).

The above groove forming step is carried out under the following processing conditions, for example.

Light source of laser beam: YVO4 laser or YAG laser

Wavelength: 355 nm

Repetition frequency: 50 kHz

Average output: 4 W

Focal spot diameter: 20 μm

Processing-feed rate: 150 mm/sec

Figure 5:
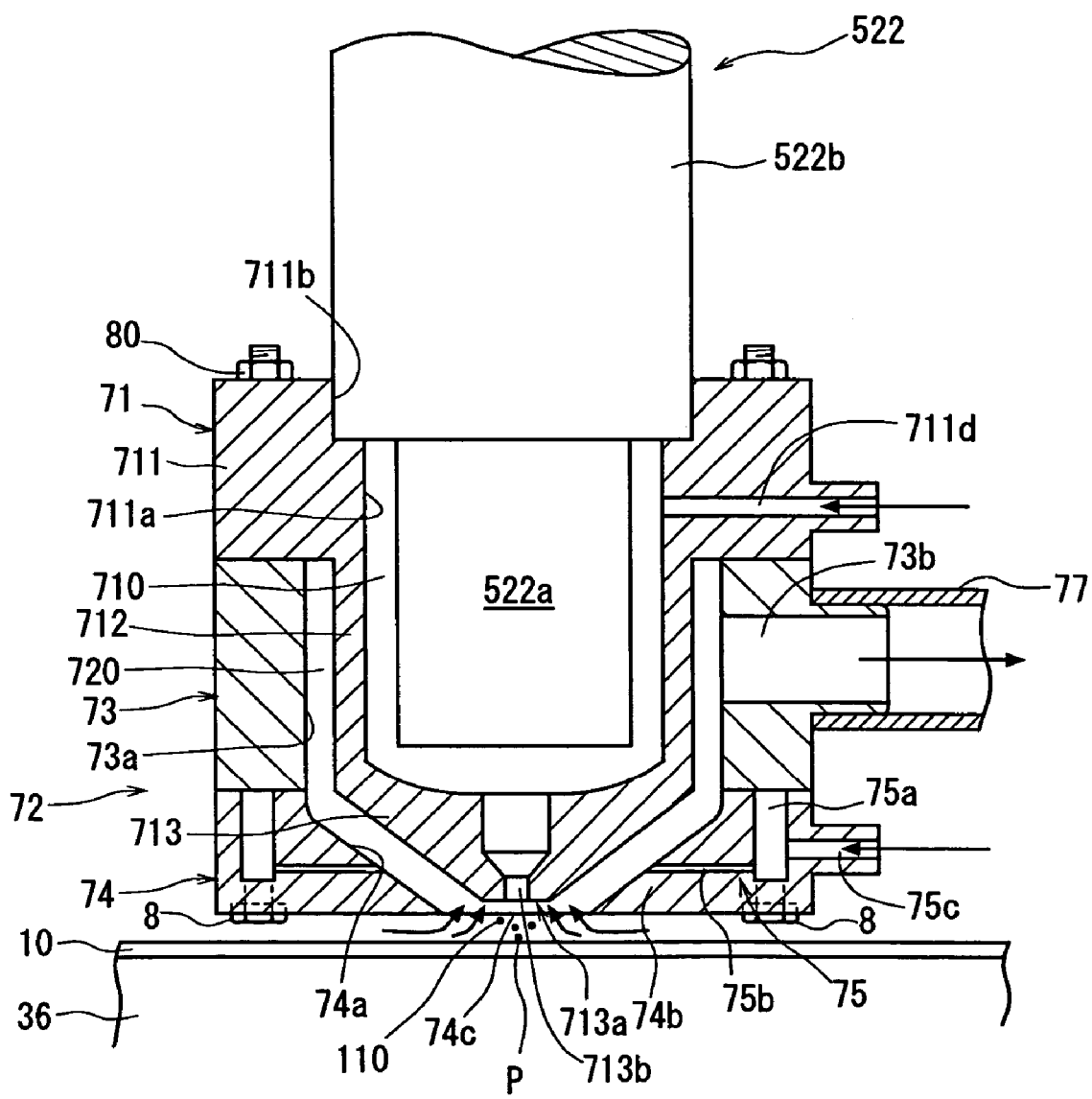
FIG. 5 is a sectional view of the dust discharge means in a state where it carries out the groove forming step shown in FIGS. 4(a) and 4(b)

In the above groove forming step, the semiconductor wafer is molten and dust such as debris is produced by applying the pulse laser beam to the front surface of the semiconductor wafer 10 from the condenser 522. Therefore, as the laser beam processing machine comprises the dust discharge means 7 in the illustrated embodiment, the dust 110 produced by the application of the pulse laser beam to the semiconductor wafer 10 is sucked into the dust collection chamber 720 through the second opening 74c in which negative pressure has been generated, and discharged from the exhaust dust 77 through the exhaust port 73b as shown in FIG. 5. Since a swirling flow is formed in the dust collection chamber 720 by high-speed air ejected from the plurality of air ejection holes 75b, the sucked dust 110 is discharged through the exhaust port 73b smoothly without accumulating in the dust collection chamber 720, whereby a dust discharge function is maintained for a long time. Therefore, the dust 110 does not adhere to a device formed on the front surface of the semiconductor wafer 10. Since air supplied from the first air supply means 76 is ejected toward the second opening 74c from the first opening 713b through the air introduction hole 711d and the air introduction chamber 710 as described above, the dust 110 sucked from the second opening 74c does not enter the air introduction chamber 710 through the first opening 713b and therefore, do not adhere to the condenser lens of the condenser 522.

What is claimed is:

1. A laser beam processing machine comprising a chuck table for holding a workpiece, a laser beam application means having a condenser for applying a laser beam to the workpiece held on the chuck table to process it, and a dust discharge means for collecting and discharging dust produced by the application of a laser beam to the workpiece from the condenser, wherein the dust discharge means comprises:

a first cover member which is mounted on a lower end of the condenser and has in a bottom wall thereof a first opening for allowing a laser beam applied from the condenser pass therethrough, a second cover member which is arranged to surround the first cover member and has in a bottom wall thereof a second opening for letting a laser beam applied from the condenser pass therethrough and for sucking in dust, the first cover member and the condenser defining therebetween an air introduction chamber which communicates with the first opening, and the first cover member and the second cover member defining therebetween an annular dust collection member which communicates with the second opening and surrounds the air introduction chamber, a first air supply means for supplying air to the air introduction chamber, a swirling flow generating means for generating a swirling flow in the dust collection chamber, the swirling flow generation means causing the swirling flow generated in the dust collection chamber to create, in the second opening, a negative pressure which causes air in the air introduction chamber to flow into the dust collection chamber and which causes outside air to flow through the second opening into the dust collection chamber, a second air supply means for supplying air to the swirling flow generating means, and an exhaust means connected to the dust collection chamber.

2. The laser beam processing machine according to claim 1, wherein a tapered portion which is tapered toward its lower end is provided in the lower part of the first cover member, and a dust collection chamber-forming hole having an inner wall which is tapered toward its lower end in conformity with the outer wall of the tapered portion of the first cover member is formed in the lower part of the second cover member.

3. The laser beam processing machine according to claim 1, wherein the swirling flow generating means has a plurality of air ejection holes formed in the tangential direction to the inner wall of the dust collection chamber-forming hole and an air passage communicating with the plurality of air ejection holes and the second air supply means in the lower part of the second cover member.

* * * * *